United States Patent [19]

Aoshima

[11] Patent Number: 5,245,372
[45] Date of Patent: Sep. 14, 1993

[54] CAMERA USING A FILM WITH A MAGNETIC MEMORY PORTION WITH A TWO-SPEED FILM TRANSPORTING FEATURE

[75] Inventor: Chikara Aoshima, Zama, Japan

[73] Assignee: Canon Kabushiki Kaisha, Tokyo, Japan

[21] Appl. No.: 850,836

[22] Filed: Mar. 13, 1992

[30] Foreign Application Priority Data

Mar. 14, 1991 [JP] Japan .................................. 3-073747

[51] Int. Cl.⁵ .............................................. G03B 17/24
[52] U.S. Cl. ..................................... 354/106; 354/173.1
[58] Field of Search ............ 354/105, 106, 212, 173.1, 354/173.11; 360/88, 90

[56] References Cited

U.S. PATENT DOCUMENTS

4,864,332 9/1989 Harvey .................................. 354/21
5,184,161 2/1993 Egawa .................................. 354/105

Primary Examiner—Michael L. Gellner
Assistant Examiner—Howard B. Blankenship
Attorney, Agent, or Firm—Fitzpatrick, Cella, Harper & Scinto

[57] ABSTRACT

A camera uses a film with a magnetic memory portion and includes a film transporting circuit for transporting the film, a magnetic operation circuit for writing or reading information to or from the magnetic memory portion of the film during the film transporting operation by means of the film transporting circuit and control circuit for controlling the film transporting circuit in such a manner that a film transporting speed at the time information is written by the magnetic operation circuit is slower than a film transporting speed at the time the information is read by the magnetic circuit.

18 Claims, 5 Drawing Sheets

CAMERA USING A FILM WITH A MAGNETIC MEMORY PORTION WITH A TWO-SPEED FILM TRANSPORTING FEATURE

BACKGROUND OF THE INVENTION

1. Field of the Invention

The present invention relates to an improvement in a camera using a film with a magnetic memory portion, and comprising a film transporting means for transporting a film and a magnetic head for writing or reading information to or from the magnetic memory portion of the film (sometimes referred to herein as "magnetic memory portion") while the film transporting means is transporting the film.

2. Description of the Related Art

A camera using a film with a magnetic memory portion has been disclosed in U.S. Pat. No. 4,864,332. The camera disclosed therein is arranged to write photographic information pertaining to a shutter time, an aperture value, a date, a title, etc., to the magnetic memory portion, and to read out the written information by means of a magnetic head.

In a camera of the aforementioned type, when the information is read from the magnetic memory portion of the film by the magnetic head, there is a proportional relationship between a transporting speed of the film and a magnitude of a signal read from the magnetic portion, i.e., a magnitude of a change in magnetic flux. Therefore, in order to stably read the signal from the magnetic memory portion, the transporting speed of the film must be as fast as possible.

However, the fast transporting speed of the film prevents a large amount of information from being written to the magnetic memory portion of the film for the following reason.

When the information is written to the magnetic memory portion of the film by the magnetic head, a fixed time T is required for the electric current applied to the coil portion of the magnetic head to reach a steady state. In order to write a large amount of information to the magnetic memory portion, it is necessary to make the writing frequency high. However, when the transporting speed of the film is fast, the time T occupies a large fraction of one signal since the time T is fixed, and therefore a large amount of information cannot be written stably to the magnetic memory portion.

SUMMARY OF THE INVENTION

In one aspect of the present invention, there is provided a camera using a film with a magnetic memory portion, or a film transporting apparatus for such a camera, comprising film transporting means for transporting the film, magnetic operation means for writing or reading information to or from the magnetic memory portion of the film during the film transporting operation by means of the film transporting means, and control means for controlling the film transporting means in such a manner that a film transporting speed at the time the information is written by the magnetic operation means is slower than at the time the information is read by the magnetic operation means. Accordingly, when the information is written to the magnetic memory portion of the film, the film transporting speed is decreased to enable a lot of information to be stably written on the magnetic memory portion, and when the information is read from the magnetic memory portion of the film, the film transporting speed is increased to enable the information to be stably read from the magnetic memory portion.

Other aspects of the present invention will become apparent from the following description of the preferred embodiments of the present invention.

DETAILED DESCRIPTION OF THE PREFERRED EMBODIMENTS

Preferred embodiments of the present invention now will be described with reference to the accompanying drawings.

Figure 1:
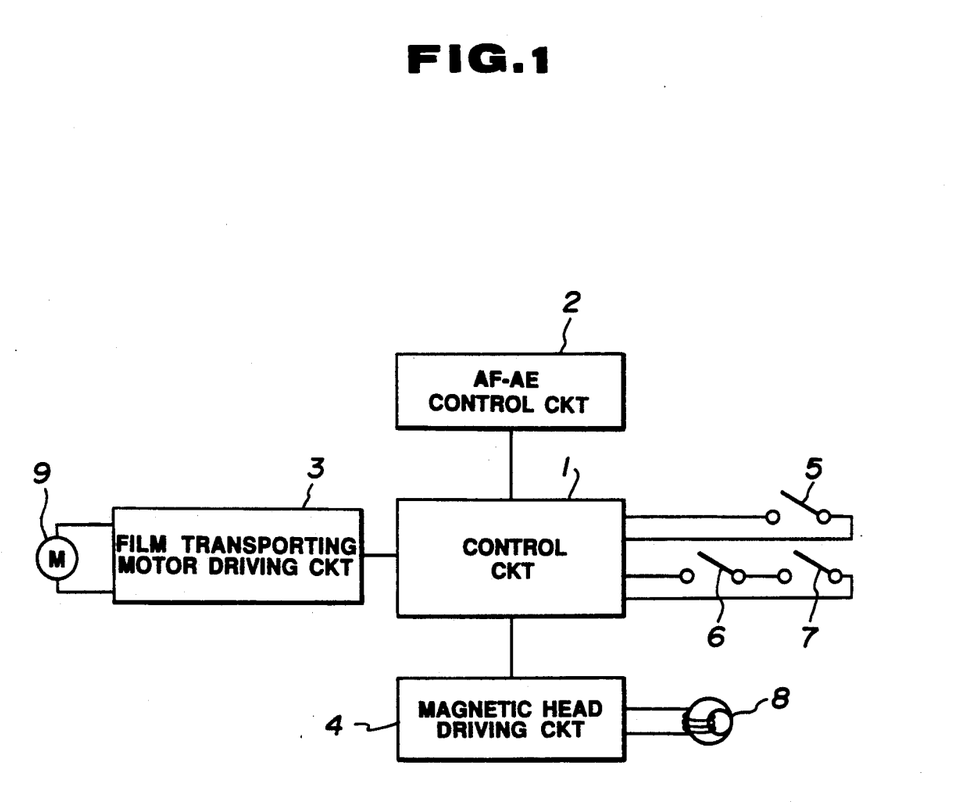
FIG. 1 is a circuit block diagram of a camera showing a first embodiment of the present invention.

FIG. 1 is a circuit block diagram of a camera showing a first embodiment of the present invention.

Referring to FIG. 1, reference numeral 1 denotes a control circuit comprising a microcomputer for controlling individual operations of the camera. Reference numeral 2 denotes an AF-AE control circuit for controlling a focusing operation of a photographic lens and an operation of an exposure control shutter. Reference numeral 3 denotes a film transporting motor driving circuit for driving a film transporting motor 9. Reference numeral 4 denotes a magnetic head driving circuit for driving a magnetic head 8 to write or read information to or from a magnetic memory portion of a film. Reference numeral 5 denotes a release switch arranged in such a manner that the camera is released when the release switch is turned on. Reference numeral 6 denotes a switch arranged to be turned on by setting an unillustrated film cartridge into the camera. Reference numeral 7 denotes a switch arranged to be turned on by closing a back lid of the camera (not shown). When the both switches 6 and 7 are turned on, the control circuit 1 drives the film transporting motor driving circuit 3 to start transporting the film to set the first frame.

Reference numeral 9 denotes the aforementioned film transporting motor for driving a well-known gear train to drive an unillustrated spool and fork of the camera.

Figure 2:
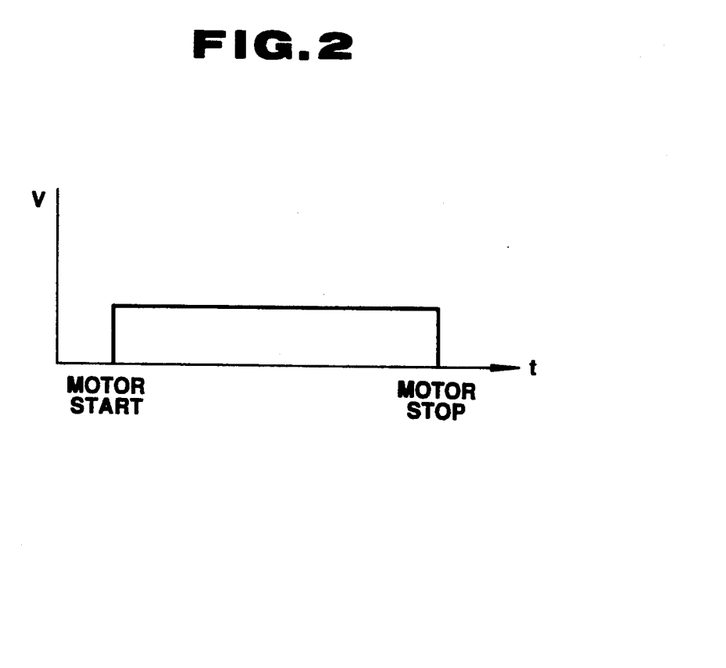
FIG. 2 is an explanatory diagram of the film transporting speed at the time information is read out in accordance with the first embodiment of the present invention.
Figure 3:
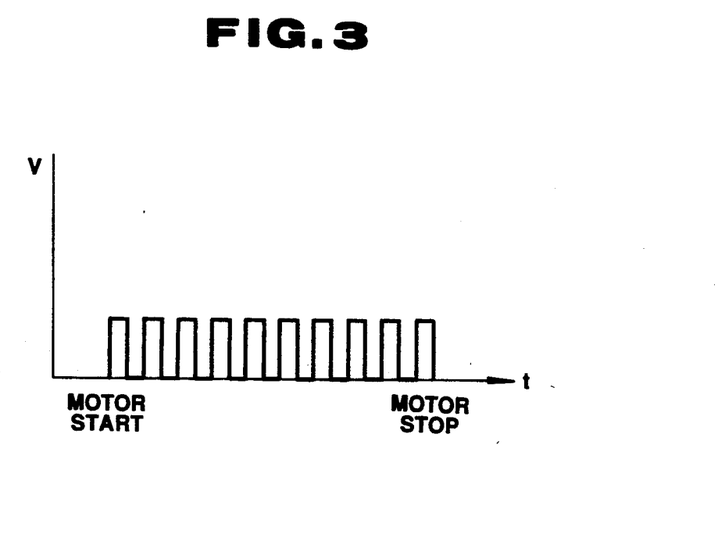
FIG. 3 is an explanatory diagram of the film transporting speed at the time information is written to the memory portion of the film in accordance with the first embodiment of the present invention.

In this embodiment, regarding the driving operation of the film transporting motor driving circuit 3, two modes of operation are provided. One is a full-feed mode for feeding a continuous electric current to the film transporting motor 9 as shown in FIG. 2. The other is a pulse-feed mode for feeding a pulse-form electric current, that is, feeding of the electric current is repeated in very short pulses, as shown in FIG. 3. The control circuit 1 selects one of these two kinds of modes as will be described later. The film transporting speed in the full-feed mode is faster than in the pulse-feed mode because the rotational output of the film transporting motor 9 in the full-feed mode is faster than that in the pulse-feed mode. In addition, changing the output value of the film transporting motor 9 can be also accomplished by changing the ratio between feeding and not feeding the current in the pulse-feed mode.

An operation of the aforementioned control circuit 1 will be described below with reference to the flowchart of FIG. 4.

(Step 99) The operation of the control circuit i from step 100 will be started by supplying power from a battery of the camera in step 99.

(Step 100) It is determined whether the switch 6, which is turned on by setting the film cartridge into the camera (not shown), and the switch 7, which is turned on by closing the back lid (not shown) of the camera, are both on. If they are both on, the film setting operation is regarded as completed and the process goes to step 101.

(Step 101) The film transporting motor driving circuit 3 is driven to start transporting the film to set the first frame on the aperture, i.e. A film blank transporting operation, by means of the film transporting motor 9. At this time, the film transporting motor 9 is controlled in the full-feed mode as shown in FIG. 2.

(Step 102) During the film blank transporting operation, the magnetic head 8 is driven through the magnetic head driving circuit 4 to read out previously recorded film information from the magnetic memory portion, pertaining to the film speed, the specified number of the film frames, the kind of film, e.g. A negative or a positive, etc., and to store the information in memory portions in the control circuit 1.

At this time, the film transporting speed is fast because the film transporting motor 9 is driven in the full-feed mode as above-described. Therefore, the signals read out by the magnetic head 8 are large and stable.

(Step 103) Whether a complete film transporting operation to set the first frame has occurred is determined by a well-known means, i.e. A detection of the film transporting amount by means of an encoder, an interval of feeding the motor, a detection of perforations of the film, etc. If the complete film transporting operation is detected, the process goes to step 104.

(Step 104) Driving of the film transporting motor driving circuit 3 is stopped to stop the film transporting motor 9. As a result, the film blank transporting operation is terminated.

(Step 105) The state of the release switch 5 is determined. If the release switch 5 is on, a release operation is regarded as completed and the process goes to step 106.

(Step 106) AF-AE control circuit 2 is driven to perform well-known photographic operations, such as the focusing of the photographic lens, the exposure operation by means of opening and closing the shutter, etc.

(Step 107) The number of exposed film frames is compared with the specified number of film frames which was read out in the aforementioned step 102 or was set in advance by a well-known means, to determine whether any exposable film is left. If an exposable frame of the film is left, the process goes to step 108. If no exposable frame of the film is left, the process goes to step 112.

(Step 108) The film transporting motor 3 is driven to start winding the film by means of the film transporting motor 9 so that the next frame of the film reaches the aperture. At this time, the film transporting motor 9 is controlled in the pulse-feed mode.

(Step 109) During the film winding operation, the magnetic head 8 is driven through the magnetic head driving circuit 4 to write photographic information, e.g. A shutter speed, an aperture value, a date when the photographing is performed, etc., to the magnetic memory portion of the film corresponding to the photographed frame.

At this time, the film transporting speed is slow because the film transporting motor 9 is driven in the pulse-feed mode as above-described. Therefore, the amount of film transported before the time T, which the writing outputs from magnetic head requires to be stable expires, is reduced. Consequently, more signals, which are more stable, can be written to the magnetic memory portion of the film by the magnetic head 8. That is, many signals in a stable state can be written to the magnetic memory portion of the film.

(Step 110) It is determined whether winding to the next frame of the film is completed. If winding is completed, the process goes to step 111. If winding is not completed, the process returns to the step 108 and the aforementioned film winding operation is repeated.

(Step 111) Driving of the film transporting motor driving circuit 3 is stopped to stop winding the film and then the process returns to the step 105.

In the aforementioned step 107, if it is determined that no exposable film is left, the process goes to step 112.

(Step 112) The film transporting motor driving circuit 3 is driven to drive the film transporting motor 9 in a film rewinding direction and to start rewinding the film into the film cartridge (not shown). At that time, the motor 9 may be controlled either in the full-feed mode or in the pulse-feed mode, because the magnetic head 8 is not driven.

(Step 113) It is determined whether rewinding the film into the cartridge is completed. If rewinding is completed, the process goes to step 114.

(Step 114) The whole process of the above-described camera is completed.

Figure 5:
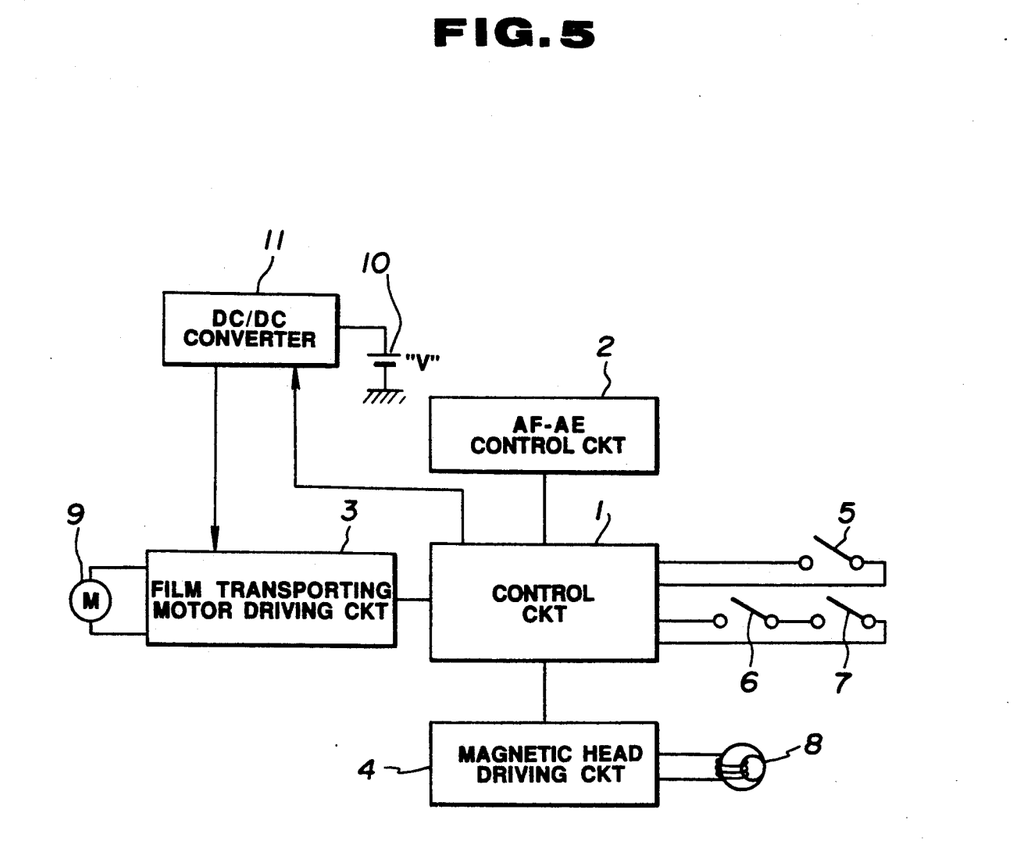
FIG. 5 is a circuit block diagram of a camera showing a second embodiment of the present invention.

FIG. 5 is circuit block diagram of a camera in accordance with a second embodiment of the present invention.

In this embodiment, two voltage levels are provided for driving film transporting motor 9, that is, a voltage "V1" and a voltage "V2" (V1<V2), are provided. When the information is written to the magnetic memory portion of the film by the magnetic head 8, the film transporting motor 9 is driven by the lower voltage V1 and when the information is read from the magnetic memory portion of the film by the magnetic head 8, the film transporting motor 9 is driven by the higher voltage V2, whereby the film transporting speed is changed.

Referring to FIG. 5, reference numeral 11 denotes a DC/DC converter for generating the two voltage levels V1 and V2 (V1<V2), where V1 and V2 are voltages converted from the voltage "V" of a battery 10. The control circuit 1 controls the DC/DC converter 11 in such a manner that when the information is read from the magnetic memory portion of the film by the magnetic head 8, the DC/DC converter 11 supplies voltage V2 to the film transporting motor driving circuit 3. When the information is written on the magnetic memory portion of the film by the magnetic head 8, the DC/DC converter 11 supplies the voltage V1 to the film transporting motor driving circuit 3. Thus, the film transporting speed at the time the information is read from the magnetic memory portion of the film is increased and the film transporting speed at the time the information is written to the magnetic memory portion of the film is decreased. In this way, it is possible to obtain the same effect as that achieved with the first embodiment.

Figure 6:
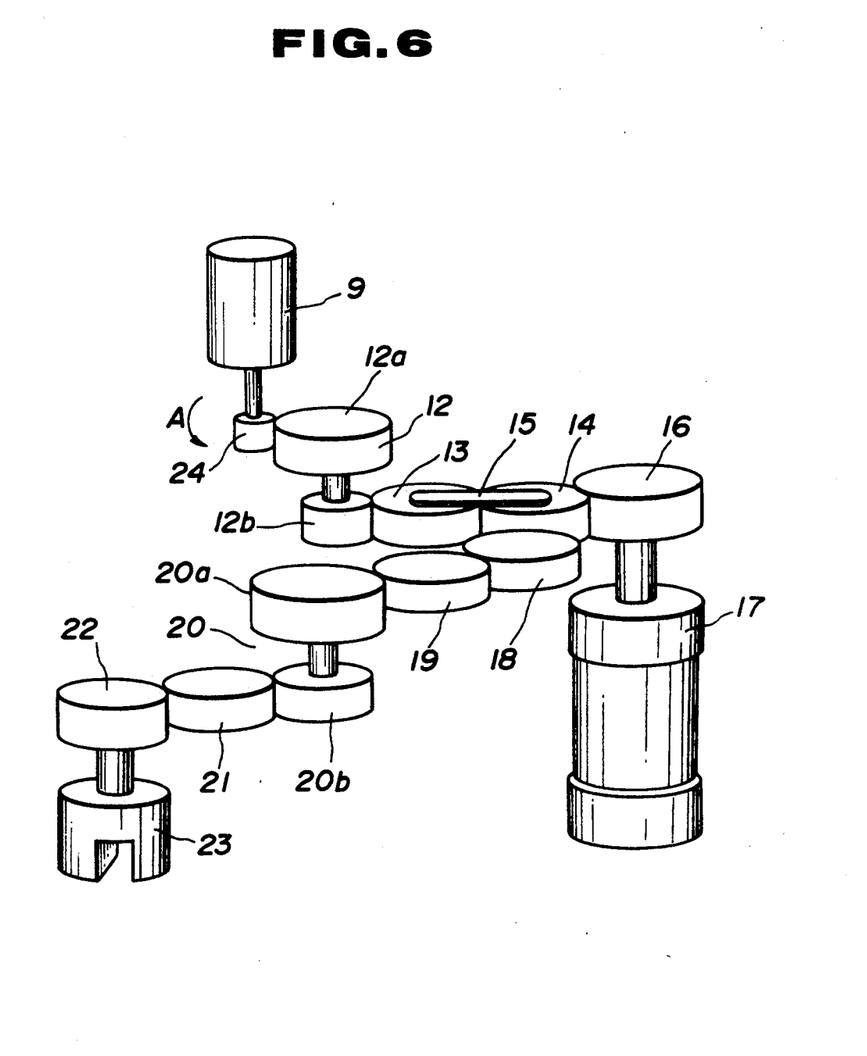
FIG. 6 is a perspective view of a mechanical construction of a camera showing a third embodiment of the present invention.

FIG. 6 is a perspective view of a mechanical construction of the essential parts of a camera in accordance with a third embodiment of the present invention.

In FIG. 6, reference numeral 9 is the aforementioned film transporting motor, which is rotatable in a direction of an arrow A and also in a reverse direction thereof in combination with a gear transmission train. Reference numeral 24 denotes a pinion fixed on a rotating output shaft of film transporting motor 9. Reference numeral 12 denotes a first speed reducing gear, wherein a large gear portion 12a thereof meshes with pinion 24. Reference numeral 13 denotes a sun gear meshing with a small gear portion 12b of the first speed reducing gear 12. Reference numeral 14 denotes a planetary gear, which is rotatably supported on a planetary lever 15 and meshes with the sun gear 13. Reference numeral 15 denotes the aforementioned planetary lever, which is rotatably supported coaxially with an axis of rotation of the sun gear 13 and constitutes a well-known planetary gear mechanism together with the sun gear 13 and the planetary gear 14, wherein the planetary gear 14 is rotated around the sun gear 13 by rotating of the sun gear 13. Reference numeral 16 denotes spool gear, which meshes with the planetary gear 14 by means of the rotation of the film transporting motor 9 in the direction of the arrow A. Reference numeral 17 denotes a film take-up spool fixed on the spool gear 16. Reference numeral 18 denotes a first idler gear, which meshes with the planetary gear 14 by means of the rotation of the film transporting motor 9 in the reverse direction of the arrow A. Reference numeral 19 denotes a second idler gear meshing with the first idler gear 18. Reference numeral 20 denotes a second speed reducing gear, wherein a large gear portion 20a thereof meshes with the second idler gear 19. Reference numeral 21 denotes a third idler gear meshing with a small gear portion 20b of the second speed reducing gear 20. Reference numeral 22 denotes a fork gear rotating integrally with the fork gear 22 and engaging with a film spool in a film cartridge (not shown).

The film transporting motor 9 rotates the film take-up spool 17 by means of rotation in the direction of the arrow A and rotates the fork 23 by means of rotating in the reverse direction of the arrow A. The film transporting speed at the time the film take-up spool 17 takes up the film is S1, and the film transporting speed at the time the fork 23 rewinds the film into the film cartridge is S2. The gear ratio of the aforementioned gear transmission train is arranged to be S1>S2.

The camera according to this embodiment is a "prewind" type camera, wherein at first, virtually all of the film is wound up around the film take-up spool 17, and then photographing is performed while the film is rewound into the film cartridge one frame at a time.

The information on the film is read from the magnetic memory portion of the film by a magnetic head (not shown) when the film is wound up, and the photographic information is written to the magnetic memory portion of the film by the magnetic head when the film is rewound into the film cartridge one frame at a time after photographing is performed.

Therefore the film transporting speed at the time the information is read from the magnetic memory portion of the film (at the time the film is wound up) is increased, and the film transporting speed at the time the information is written to the magnetic memory portion of the film (at the time the film is rewound), is decreased. Accordingly, it is possible to obtain the same effect as that achieved with the first embodiment.

According to the aforementioned embodiments, the film transporting speed at the time the information is read from the magnetic memory portion of the film, is increased, and the film transporting speed at the time the information is written to the magnetic memory portion of the film, is decreased. Therefore, when the information is written to the magnetic memory portion of the film, the amount of film transported before the time, when the writing outputs from the magnetic head becomes stable, is reduced. Accordingly, more stable signals can be written to the magnetic memory portion of the film by the magnetic head, and when the information is read from the magnetic memory portion of the film, the signals read from the magnetic memory portion of the film by the magnetic head can be large and stable. That is, reading the information and writing a large amount of information from and to the magnetic memory portion of the film can be stably performed.

The individual components shown in schematic or block form in the Drawings are all well-known in the camera arts and their specific construction and operation are not critical to the operation or best mode for carrying out the invention.

While the present invention has been described with respect to what is presently considered to be the preferred embedments, it is to be understood that the invention is not limited o th disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A camera using a film with a magnetic memory portion; comprising;
   (a) film transporting means for transporting the film;
   (b) magnetic operation means for writing or reading information to or from said magnetic memory portion of said film during the film transporting operation of said film transporting means; and
   (c) control means for controlling said film transporting means in such a manner that a film transporting speed at the time the information is written by said magnetic operation means is slower than a film transporting speed at the time the information is read by said magnetic operation means.

2. A camera according to claim 1, wherein said magnetic operation means comprises a magnetic head.

3. A camera according to claim 1, wherein said control means comprises means for controlling said film transporting means in such a manner that the film transporting speed is increased when a film blank transporting operation is performed.

4. A camera according to claim 1, wherein said control means comprises means for controlling said film transporting means in such a manner that the film transporting speed is decreased when a one-frame winding-up operation is performed.

5. A camera according to claim 1, wherein said control means comprises means for controlling said film transporting means in such a manner that the film transporting speed is decreased when a one-frame rewinding operation is performed.

6. A camera according to claim 1 wherein said control means comprises means for controlling said film transporting means by means of changing a current supplied to said film transporting means.

7. A camera according to claim 1, wherein said control means comprises means for controlling said film transporting means by means of changing a voltage supplied to said film transporting means.

8. A camera according to claim 1, wherein said film transporting means comprises a gear transmission train, and said control means comprises means for changing a rotation direction of said gear transmission train.

9. A camera according to claim 1, wherein said film transporting means comprises a gear transmission train, and said control means comprises means for changing a gear ratio of said gear transmission train.

10. A film transporting apparatus for a camera using a film with a magnetic memory portion; comprising;
  (a) film transporting means for transporting the film;
  (b) magnetic operation means for writing or reading information to or from said magnetic memory portion of said film during the film transporting operation by means of said film transporting means; and
  (c) control means for controlling said film transporting means in such a manner that a film transporting speed at the time the information is written by said magnetic operation means is slower than a film transporting speed at the time the information is read by said magnetic operation means 11. An apparatus according to claim 10, wherein said magnetic operation means comprises a magnetic head.

12. An apparatus according to claim 10, wherein said control means comprises means for controlling said film transporting means in such a manner that the film transporting speed is increased when a film blank transporting operation is performed.

13. An apparatus according to claim 10, wherein said control means comprises means for controlling said film transporting means in such a manner that the film transporting speed is decreased when a one-frame film winding-up operation is performed.

14. An apparatus according to claim 10, wherein said control means comprises means or controlling said film transporting means in such a manner that the film transporting speed is decreased when a one-frame film rewinding operation is performed.

15. An apparatus according to claim 10 wherein said control means comprises means for controlling said film transporting means by means of changing a feed mode of said film transporting means.

16. An apparatus according to claim 10, wherein said control means comprises means for controlling said film transporting means by means of changing a voltage of said film transporting means.

17. An apparatus according to claim 10, wherein said film transporting means comprises a gear transmission train, and said control means comprises means for changing a rotation direction of said gear transmission train.

18. An apparatus according to claim 10, wherein said film transporting means comprises a gear transmission train, and said control means comprises means for changing a gear ratio of said gear transmission train.

* * * * *

UNITED STATES PATENT AND TRADEMARK OFFICE
CERTIFICATE OF CORRECTION

PATENT NO. : 5,245,372  
DATED : September 14, 1993  
INVENTOR(S) : Chikara Aoshima It is certified that error appears in the above-indentified patent and that said Letters Patent is hereby corrected as shown below:

IN THE DRAWINGS - SHEET 3 OF 5:

FIGURE 4:

"LEET" should read --LEFT--.

Figure 4:
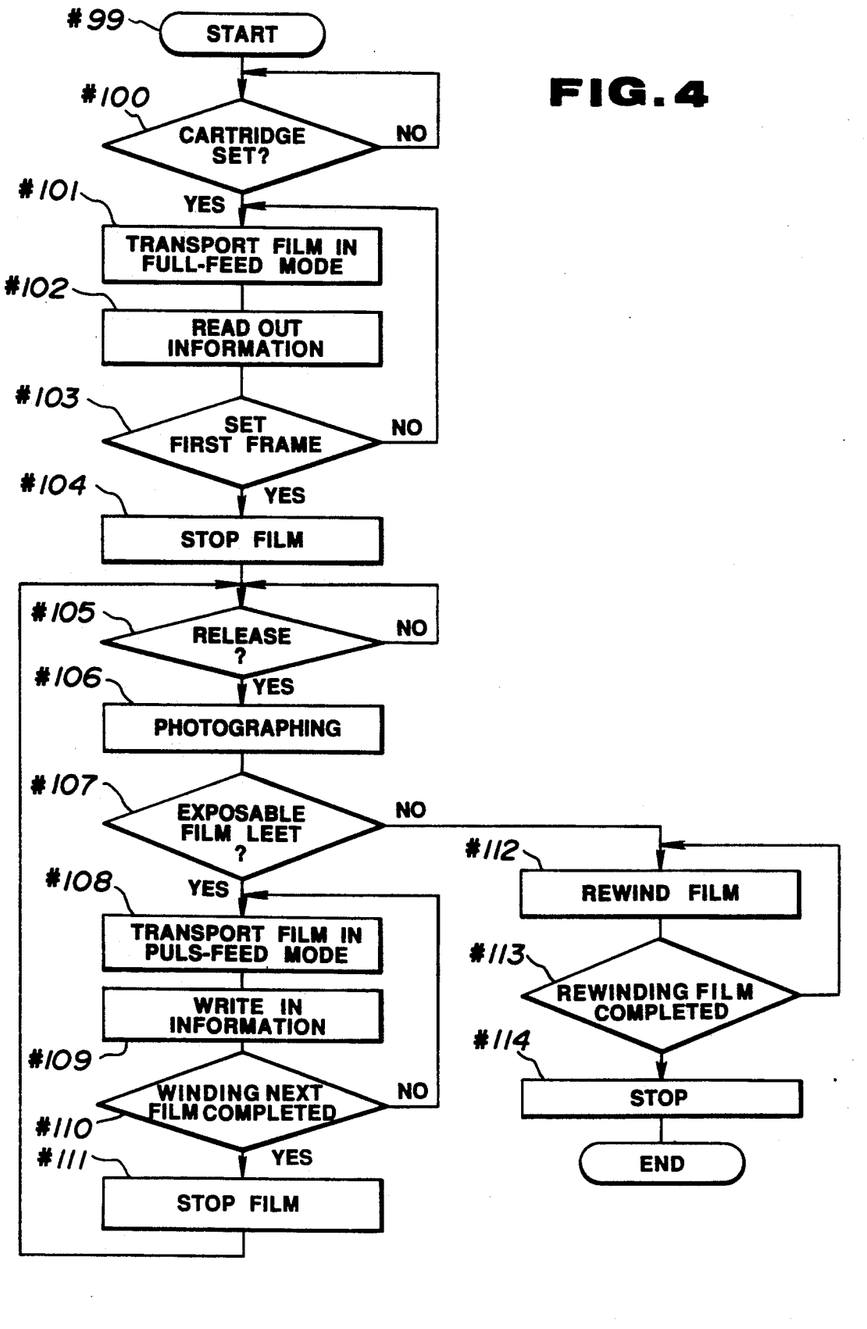
FIG. 4. is a flowchart showing an operation of the control circuit shown in FIG. 1.

COLUMN 2:

line 19, "Fig. 4." should read --Fig. 4--.

COLUMN 3:

line 11, "circuit i" should read --circuit 1--;
line 23, "i.e. A" should read --i.e. a--;
line 32, "e.g. A" should read --e.g. a--; and
line 42, "i.e. A: should read --e.g. a--.

COLUMN 5:

line 45-46, "Reference numeral 22" should read --Reference numeral 23--.

UNITED STATES PATENT AND TRADEMARK OFFICE
CERTIFICATE OF CORRECTION

PATENT NO. : 5,245,372
DATED : September 14, 1993
INVENTOR(S) : Chikara Aoshima

It is certified that error appears in the above-indentified patent and that said Letters Patent is hereby corrected as shown below:

COLUMN 6:

line 36, "embedments," should read --embodiments,--;
line 37, "o th" should read --to the--; and
line 46, "portion; comprising;" should read --portion, comprising:--.

COLUMN 7:

line 27, "portion; comprising;" should read --portion, comprising:--.

Signed and Sealed this

Seventeenth Day of May, 1994

Attest:

BRUCE LEHMAN

Attesting Officer         Commissioner of Patents and Trademarks